(12) United States Patent
Hong et al.

(10) Patent No.: US 10,191,487 B2
(45) Date of Patent: Jan. 29, 2019

(54) CONTROL DEVICE AND CONTROL METHOD FOR FLYING BOT

(71) Applicant: LG ELECTRONICS INC., Seoul (KR)

(72) Inventors: Kichu Hong, Seoul (KR); Guimok Cho, Seoul (KR); Kihyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 15/526,314

(22) PCT Filed: Nov. 14, 2014

(86) PCT No.: PCT/KR2014/010960
§ 371 (c)(1),
(2) Date: May 11, 2017

(87) PCT Pub. No.: WO2016/076463
PCT Pub. Date: May 19, 2016

(65) Prior Publication Data
US 2017/0329325 A1    Nov. 16, 2017

(51) Int. Cl.
*G05D 1/00*        (2006.01)
*B64C 13/20*       (2006.01)
(Continued)

(52) U.S. Cl.
CPC .......... *G05D 1/0038* (2013.01); *B64C 13/20* (2013.01); *B64C 39/024* (2013.01); *B64D 47/08* (2013.01);
(Continued)

(58) Field of Classification Search
CPC ........ G05D 1/00; B64C 39/00; B64C 39/024; B64D 47/08; G08C 17/02; H04Q 9/00
See application file for complete search history.

(56) References Cited

U.S. PATENT DOCUMENTS 8,948,935 B1 *  2/2015  Peeters ................ B64C 39/024
                                                    701/3
9,464,506 B2 * 10/2016  Coon ................... E21B 34/102
                        (Continued)

FOREIGN PATENT DOCUMENTS

JP        2007050871        3/2007
JP        2013139256        7/2013
                  (Continued)

OTHER PUBLICATIONS

PCT International Application No. PCT/KR2014/010960, International Search Report dated Aug. 6, 2015, 4 pages.

*Primary Examiner* — Yonel Beaulieu
(74) *Attorney, Agent, or Firm* — Lee, Hong, Degerman, Kang & Waimey

(57) ABSTRACT

The present invention relates to a device capable of controlling a flying bot and a control method therefor, the device comprising: a communication unit for performing wireless communication with the flying bot; a display unit for displaying image information related to the control of the flying bot; a user input unit for controlling a flying state of the flying bot and a function which can be performed by the flying bot; a detection unit for detecting at least one of a rotating direction, a moving direction and a tilt state of the flying bot; and a control unit for receiving, from the flying bot, information about a location and/or a surrounding situation of the flying bot through the communication unit and changing a flight control manner of the flying bot on the basis of the received result, wherein, according to the changed flight control manner of the flying bot, the control unit determines, on the basis of a location of a user, the moving direction and the rotating direction of the flying bot according to an input into the user input unit.

18 Claims, 9 Drawing Sheets

(51) Int. Cl.
*B64C 39/02* (2006.01)
*G08C 17/02* (2006.01)
*H04Q 9/00* (2006.01)
*B64D 47/08* (2006.01)

(52) U.S. Cl.
CPC ......... *G05D 1/0016* (2013.01); *G05D 1/0044* (2013.01); *G08C 17/02* (2013.01); *H04Q 9/00* (2013.01); *B64C 2201/027* (2013.01); *B64C 2201/108* (2013.01); *B64C 2201/146* (2013.01); *G08C 2201/30* (2013.01); *G08C 2201/50* (2013.01); *G08C 2201/91* (2013.01)

(56) References Cited

U.S. PATENT DOCUMENTS

| | | | |
|---|---|---|---|
| 9,567,078 B2* | 2/2017 | Zang | G05D 1/0038 |
| 2014/0008496 A1 | 1/2014 | Ye et al. | |
| 2016/0292696 A1* | 10/2016 | Gong | H04L 63/101 |
| 2017/0108877 A1* | 4/2017 | Zang | G05D 1/0038 |
| 2017/0322551 A1* | 11/2017 | Zang | G05D 1/0038 |
| 2018/0072417 A1* | 3/2018 | Shannon | B64D 1/02 |
| 2018/0082308 A1* | 3/2018 | Gong | H04L 63/101 |
| 2018/0144558 A1* | 5/2018 | Priest | G06F 17/3028 |

FOREIGN PATENT DOCUMENTS

| | | |
|---|---|---|
| KR | 10-2011-0111156 | 10/2011 |
| KR | 1020120036684 | 4/2012 |

* cited by examiner

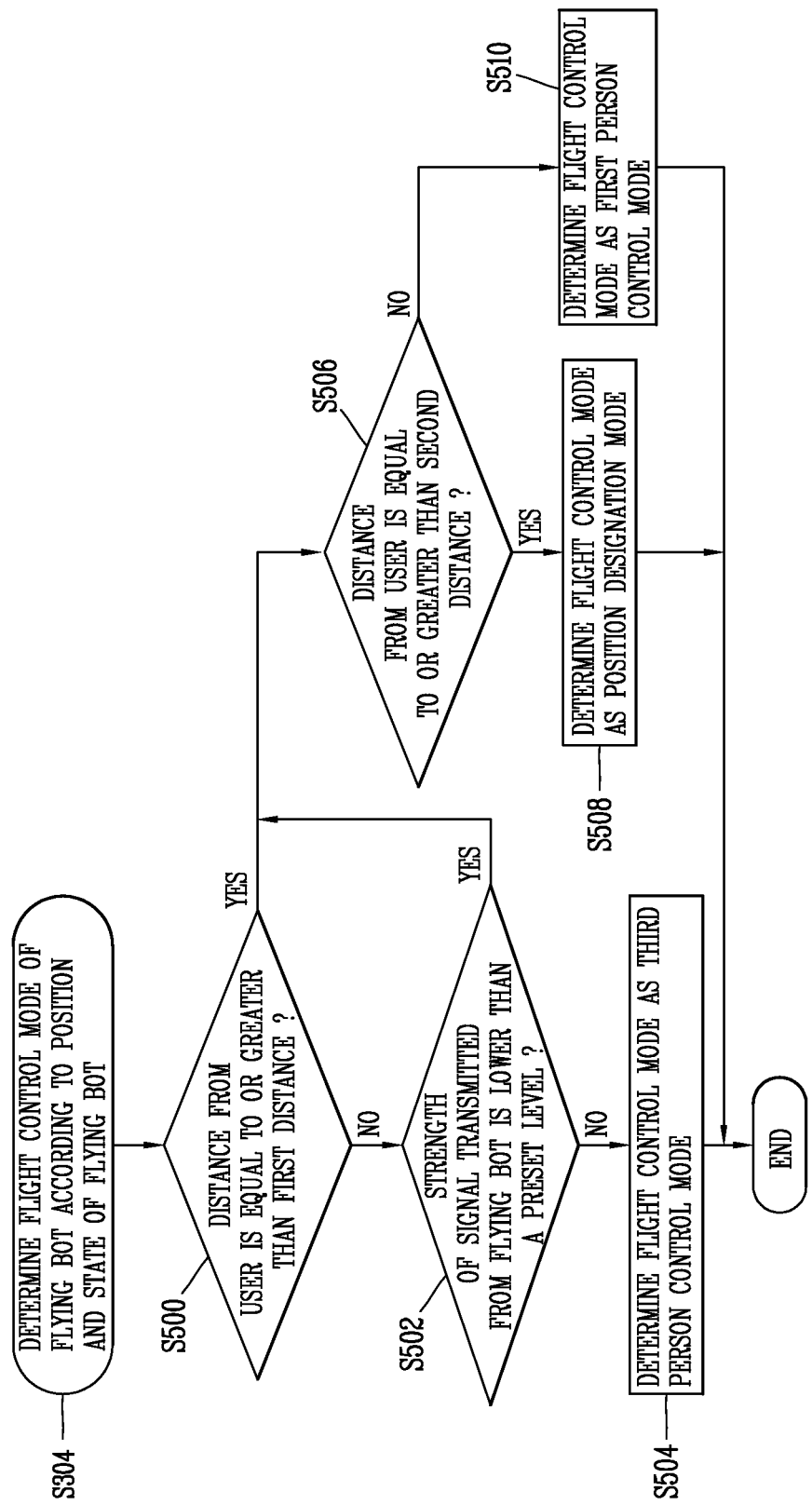

CONTROL DEVICE AND CONTROL METHOD FOR FLYING BOT

CROSS-REFERENCE TO RELATED APPLICATIONS

This application is the National Stage filing under 35 U.S.C. 371 of International Application No. PCT/KR2014/010960, filed on Nov. 14, 2014, the contents of which are all hereby incorporated by reference herein in its entirety.

TECHNICAL FIELD

The present disclosure relates to a device for controlling a flying bot and a control method thereof.

BACKGROUND ART

A flying bot may refer to a flying object capable of flying through inducement of radiowaves without a pilot. Due to the development of technologies, a flying bot has been reduced in size and currently senses a high quality camera or various sensors to provide various types of information collected from a place for users to have difficulty accessing or in the air to users.

Thus, a flying bot control device and control method for effectively controlling various functions added to a flying bot, as well as a simple flying function, has been actively studied.

DISCLOSURE

Technical Problem

An aspect of the present disclosure provides a flying bot control device capable of easily and effectively controlling a flying function of a flying bot, and a control method thereof.

Another aspect of the present disclosure provides a flying bot control device capable of appropriately and effectively controlling a flying bot according to a position and a state of the flying bot, and a control method thereof.

Another aspect of the present disclosure provides a flying bot control device capable of differently controlling a flying state of a flying bot according to a function performed by the flying bot, and a control method thereof.

Technical Solution

According to an aspect of the present disclosure, a flying bot control device includes: a communication unit performing wireless communication with a flying bot; a display unit displaying image information related to control of the flying bot; a user input unit controlling a flying state of the flying bot and a function which can be performed by the flying bot; a detection unit detecting at least one of a rotation direction, a movement direction, and a tilt state of the flying bot; and a controller receiving information regarding at least one of a position and a surrounding situation from the flying bot through the communication unit and switching a flight control mode of the flying bot on the basis of the received result, wherein, according to the changed flight control mode of the flying bot, the controller determines a movement direction and a rotation direction of the flying bot in accordance with an input to the user input unit on the basis of a location of a user.

In an embodiment, the controller may measure a distance between the flying bot and a user from a position of the flying bot and determine a flight control mode of the flying bot according to the measured distance.

In an embodiment, the controller may switch a flight control mode of the flying bot to any one of a third person control mode in which the flying bot is controlled according to a result of observing the flying bot by the user with his naked eyes on the basis of the measured distance, a first person control mode in which the flying bot is controlled on the basis of a point of view of a camera installed in the flying bot, and a position designation mode in which the flying bot is controlled on the basis of a position of the flying bot on a map.

In an embodiment, when the measured distance is smaller than a preset first distance, the controller may determine a flight control mode of the flying bot to the third person control mode, when the measured distance is equal to or greater than a preset second distance, the controller may determine a flight control mode of the flying bot to the position designation mode, and in other cases, the controller may determine a flight control mode of the flying bot to the first control mode.

In an embodiment, when the measured distance is smaller than the preset first distance, the controller may further measure strength of a signal transmitted from the flying bot and determine whether to change a flight control mode of the flying bot to the first person control mode according to whether the measured strength of the signal is equal to or higher than a lower limit value of a predetermined range set on the basis of a reference value determined according to the measured distance.

In an embodiment, when a currently set flight control mode is the first person control mode, the controller may display an image received from the camera provided in the flying bot on the display unit, determine a direction in which the camera is oriented as a forward direction of the flying bot, determine backward, leftward, and rightward directions of the flying bot on the basis of the determined forward direction, and synchronize the determined directions with keys for controlling a movement direction of the flying bot in the user input unit.

In an embodiment, when a currently set flight control mode is the third person control mode, the controller may determine a direction in which the user is positioned as a backward direction of the flying bot on the basis of a position of the flying bot, determine forward, leftward, and rightward directions of the flying bot on the basis of the determined backward direction, and synchronize the determined directions with keys for controlling a movement direction of the flying bot in the user input unit.

In an embodiment, when a currently set flight control mode is the position designation mode, the controller may display map information including information related to a current position of the flying bot on the display unit, and control the flying bot to move on the basis of a user's touch input applied to the display unit.

In an embodiment, the controller may further display information regarding a current position of the user on the map information, and when a touch input corresponding to the location of the user is applied, the controller may control the flying bot to be returned to the user.

In an embodiment, the controller may control the flying bot to be returned to the user along a path along which the flying bot has moved to the current position.

In an embodiment, when a result of sensing an obstacle adjacent to the flying bot is received from the flying bot, the controller may display information regarding the sensed obstacle on the display unit.

In an embodiment, the controller may display a position and a direction of the obstacle using separate graphic objects, and the graphic objects may be displayed in different colors or forms according to a distance between the flying bot and the sensed obstacle.

In an embodiment, the controller may display map information including a current position of the flying bot on the display unit, and display a graphic object indicating information related to the obstacle on the map information.

In an embodiment, when a flight control mode is determined as the third person control mode or the position designation mode, the controller may switch a flight control mode of the flying bot to the first person control mode according to a result of sensing a surrounding situation of the flying bot, and the flight control mode of the flying bot may be switched to the first person control mode when obstacles equal to or greater than a preset number are sensed in the vicinity of the flying bot or when obstacles equal to or greater than the preset number are recognized according to a result of analyzing an image received from the camera provided in the flying bot.

In an embodiment, the controller may switch a flight control mode of the flying bot on the basis of a result of further sensing a current altitude of the flying bot and a meteorological situation sensed by the flying bot.

In an embodiment, the flying bot control device may further include: a gaze recognizing unit recognizing user's eyes, wherein when a time duration in which the user has gazed the flying bot control device is equal to or greater than a preset time duration according to a result of recognizing the user's eyes through the gaze recognizing unit, the controller may switch a flight control mode of the flying bot to the first person control mode.

In an embodiment, the controller may drive the camera provided in the flying bot to capture an image received from the camera according to a user selection, and control a flying state of the flying bot differently according to an image capture mode of capturing the image.

In an embodiment, the image capture mode may include a panorama image capture mode for capturing a panorama image, and when the image capture mode is the panorama image capture mode, the controller may control the flying bot to move according to a movement direction in accordance with control of the user in a state in which a direction in which the camera provided in the flying bot is fixated to a specific direction in accordance with control of the user.

In an embodiment, the controller may automatically switch the image capture mode on the basis of at least one of a position, an altitude, and a surrounding situation of the flying bot according to a result of analyzing an image sensed by the camera provided in the flying bot.

According to another aspect of the present disclosure, a method for controlling a flying bot includes: receiving information related to at least one of a position and a surrounding situation of the flying bot from the flying bot; determining a flight control mode of the flying bot on the basis of the received result; determining a movement direction and a rotation direction of the flying bot on the basis of a location of the user, in accordance with a user input according to the determined flight control mode of the flying bot; providing information related to control of the flying bot to the user according to the determined flight control mode of the flying bot; and moving the flying bot according to a user input and performing a function executable in the flying bot.

Advantageous Effects

The flying bot control device and control method thereof according to the present disclosure have the following advantages.

According to at least one of embodiments of the present disclosure, since a more appropriate control mode is provided on the basis of a position and a state of the flying bot, the user may more conveniently control the flying bot.

Also, according to at least one of embodiments of the present disclosure, since a flying state of the flying bot is controlled on the basis of an operational state of the flying bot, a more appropriate flying state may be maintained in accordance with the operational state of the flying bot.

DESCRIPTION OF DRAWINGS

FIG. 5 is a flow chart illustrating an operational process of determining a flight control mode of a flying bot according to a position and a state of a flying bot during the operational process of FIG. 3.

BEST MODES

Hereinafter, the embodiments of the present invention will be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

In the present disclosure, it is assumed that a flying bot is a quardcopter having four rotters. However, the flying bot may also be a multicopter having two, six, or eight rotters, as well as the quardcoper having four rotters. The present disclosure may also be applied to a flying bot using a different scheme not using a rotter, for example, a jet propulsion scheme, or the like.

Figure 1:
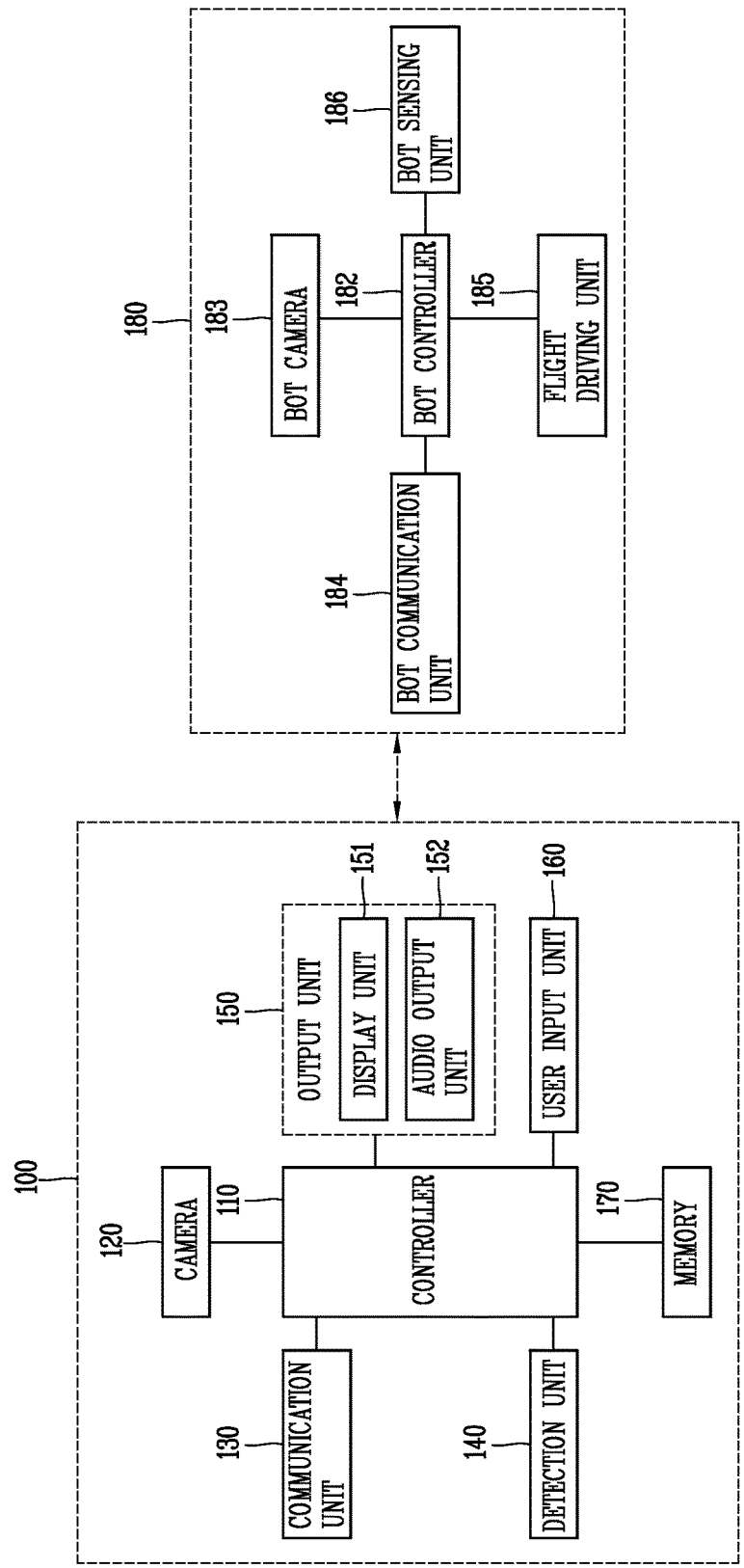
FIG. 1 is a block diagram illustrating a flying bot control device and a flying bot according to an embodiment of the present disclosure.

FIG. 1 is a block diagram illustrating a flying bot control device 100 and a flying bot 180 according to an embodiment of the present disclosure.

The flying bot control device 100 according to an embodiment of the present disclosure may include a camera 120, a communication unit 130, a sensing unit (or a detection unit) 140, an output unit 150, a user input unit 160, a controller 110, a memory 170, a power supply unit (not shown), and the like. The components illustrated in FIG. 1 are not essential to implement the flying bot control device 100 and the flying bot control device 100 may have greater or fewer components.

In detail, among the components, the camera 120 may receive an image signal. The camera 120 may include at least one of a camera sensor (e.g., a CCD, a CMOS, etc.0, a photo sensor (or an image sensor), and a laser sensor.

The camera 120 and a laser sensor may be combined to sense a user's eyes or a user's touch. The photo sensor may be stacked on a display element, and the photo sensor may include a photo diode and a transistor (TR) mounted in a row and a column and scan a movement of a sensing target according to an electrical signal changed according to an amount of light applied to the photo diode. Thus, the photo sensor may sense a direction in which the user's face is oriented and user's eyes from a received image.

The communication unit 130 may directly perform communication with the flying bot 180 using a wireless signal of a preset frequency band or perform wireless communication with the flying bot 180 through a repeater of a preset wireless communication system, or the like. To this end, the communication unit 130 may include at least one communication module allowing for communication with the flying bot 180.

Also, the communication unit 130 may further include a module for obtaining a position of the flying bot control device 100. A typical example of the position information obtaining module may be a global positioning system (GPS) module. For example, the flying bot control device 100 may obtain a position of the flying bot control device 100 using a signal transmitted from a GPS satellite by utilizing the GPS module.

The sensing unit 140 may include various sensors for controlling the flying bot 180 and at least one sensor for sensing a surrounding environment of the flying bot control device 100. For example, the sensing unit 140 may include an optical sensor (e.g., the camera 120), a magnetic sensor, a G-sensor, a gyroscope sensor, a motion sensor, an inertial sensor, and a direction sensor. Meanwhile, the controller 110 of the flying bot control device 100 may combine pieces of information sensed by at least two sensors among the foregoing sensors.

The user input unit 160 serves to receive information from a user. When information is input through the user input unit 160, the controller 180 may transmit a signal for controlling an operation of the flying bot 180 corresponding to the input information to the flying bot 180. The user input unit 123 may include a mechanical input unit (or a mechanical key, e.g., a button positioned on a front, rear, or side surface, a dome switch, a jog wheel, a jog switch, etc.). For example, a touch type input unit may be configured as a virtual key, a soft key, or a visual key displayed on a touch screen through software processing, or may be configured as a touch key disposed on a portion other than the touch screen. Meanwhile, the virtual key or the visual key may be displayed in various forms on a touch screen or may be configured as a graphic, text, icon, video, or a combination thereof, for example.

The output unit 150 serves to generate an output related to sense of sight, sense of hearing, and the like, and includes at least one of a display unit 151 and an audio output unit 152. The display unit 151 may be inter-layered or integrated with a touch sensor to implement a touch screen. The touch screen may serve as the user input unit 160 providing an input interface between the flying bot control device 100 and the user and provide an output interface between the flying bot control device 100 and the user.

Also, the memory 170 stores data supporting various functions of the flying bot control device 100. The memory 170 may store a plurality of application programs (or applications) driven in the flying bot control device 100 or data and commands for controlling an operation of the flying bot 180. At least some of the application programs may be downloaded from an external server through wireless communication. Also, at least some of the application programs may be present in the flying bot control device 100 at the time when the flying bot control device 100 was released from a factory. Meanwhile, the application programs are stored in the memory 170 and installed in the flying bot control device 100 so as to be driven by the controller 180 to control an operation (or a function) of the flying bot 180.

The controller 110 controls a general operation of the flying bot control device 100 in addition to an operation related to the application program. The controller 180 may process a signal, data, information, and the like input or output through the aforementioned components or drive an application program stored in the memory 170 to provide information or a function required for controlling the flying bot 180 to the user, and may transmit a signal for controlling the flying bot 180 according to a user input or setting.

For example, the controller 110 may determine a flying direction or a flying speed and an altitude of the flying bot 180 according to a user input through the user input unit 160. Also, the controller 110 may recognize a position and a state of the flying bot 180 from a signal received from the flying bot 180, and provide various control modes for controlling flying of the flying bot 180 to the user.

For example, the controller 110 may provide a control mode (hereinafter, referred to as a first person control mode) in which the user may control the flying bot 180 from a point of view of the flying bot 180 or a control mode (hereinafter, referred to as a third person control mode) in which the user may control the flying bot 180, while observing the flying bot 180 from a point of view of a third person. Or, the controller 110 may provide a control mode (hereinafter, referred to as a "position designation mode" in which a movement of the flying bot 180 is controlled according to a position designated by the user of the flying bot 180, to the user.

In this case, the controller 110 may display various types of information for the user to control the flying bot 180 through the output unit 150 according to a user selection or automatically. For example, when a control mode of the flying bot 180 is the first person control mode, the controller 110 may display an image received from a camera provided in the flying bot 180 on the display unit 151, and when a control mode of the flying bot 180 is a third person control mode, the controller 110 may display information regarding an altitude of the flying bot 180 a meteorological environment (e.g., a wind speed, etc.) sensed in the flying bot 180, and the like, through at least one of the display unit 151 or the audio output unit 150. Or, when a control mode of the flying bot 180 is a position designation mode, the controller 110 may display a current position of the flying bot 180 on the display unit 151. Also, the controller 110 may control a movement and flying state of the flying bot 180 according to a user input in accordance with any one of the control modes.

Meanwhile, a power supply unit (not shown) receives external power or internal power and supplies the received power to each component included in the flying bot 100 under the control of the controller 110. The power supply unit may include a battery, and the battery may be an internal battery or a replaceable battery.

Meanwhile, the flying bot 180 may include a bot camera 183, a bot communication unit 184, a bot sensing unit 186, and a flight driving unit 185. The components illustrated in FIG. 1 are not essential implementing the flying bot 180, and thus, the flying bot 180 described in this disclosure may include greater or fewer components.

In detail, among the components, the bot camera 183 may receive an image signal. The bot camera 183 may include a camera sensor such as a CCD, a CMOS, and the like, and capture an image sensed by the camera sensor under the control of the bot controller 182.

The bot sensing unit 186 may include at least one sensor for sensing a surrounding environment of the flying bot 180. For example, the bot sensing unit 186 may include a proximity sensor, an illumination sensor, an acceleration sensor, a magnetic sensor, a G sensor, a gyroscope sensor, an initial sensor, a motion sensor, an infrared sensor, an ultrasonic sensor, and a direction sensor. Also, the bot sensing unit 186 may further include an environmental sensor (e.g., a barometer, a hygrometer, a thermometer, an anemometer, etc.) Among these sensors, representative sensors will be described.

First, the proximity sensor may detect whether an object is present within a predetermined distance from the flying bot 180. For example, the proximity sensor may detect an object accessing the flying bot 180 or an object present in the vicinity of the flying bot 180 using a laser, an ultrasonic wave, an infrared ray, and the like.

Also, the gyro sensor, the direction sensor, and the initial sensor may sense a rotation direction of the flying bot 180 when the flying bot 180 rotates, and a direction in which the flying bot 180 is oriented. Also, the motion sensor may sense a current flying state, a tilt state, a rotational or movement state of the flying bot, and the acceleration sensor may sense a flying speed of the flying bot 180. The G sensor or the magnetic sensor may sense a current altitude, or the like, of the flying bot. Also, the environmental sensor may sense various meteorological situations such as atmospheric pressure, humidity, temperature, wind velocity, and the like, around the flying bot 180.

The bot communication unit 184 may include at least one communication module for performing communication with the flying bot control device 100 using a wireless signal of a preset frequency band. The bot communication unit 184 may input a signal received from the flying bot control device 100 to the bot controller 182 or may transmit image detected by the bot camera 183 and values sensed by the bot sensing unit 186 to the flying bot control device 100 under the control of the bot controller 182.

Also, the bot communication unit 185 may further include a module for obtaining a position of the flying bot control device 100. The module for obtaining position information of the flying bot 180 may be a GPS module. For example, utilizing the GPS module, the flying bot 180 may obtain a position of the flying bot 180 using a signal transmitted from a GPS satellite. Also, the position information of the flying bot 180 may be transmitted to the flying bot control device 100 through the bot communication unit 184.

The flight driving unit 185 may enable the flying bot 180 to fly under the control of the bot controller 182. The flight driving unit 185 may enable the flying bot 180 to fly in a direction in accordance with control of the bot controller 182, and also enable the flying bot 180 to fly at an altitude in accordance with control of the bot controller 182.

The bot controller 182 controls a general operation of the flying bot 180. The bot controller 182 controls the flight driving unit 185 such that the flying bot 180 flies at an altitude and in a direction in accordance with a control signal received through the bot communication unit 185. For example, the bot controller 182 may synchronize a movement direction and a rotation direction of the flying bot 180 to the user input unit 160 of the flying bot control device 100 according to a control signal received from the flying bot control device 100, and enable the flying bot 180 to fly according to a control signal input through the user input unit 160 of the flying bot control device 100.

Also, various signals requested by the flying bot control device 100 may be transmitted to the flying bot control device 100. Signals transmitted from the flying bot control device 100 may be a sensing value sensed from at least one of the sensors of the bot sensing unit 186 or may be an image captured by the bot camera 183. Also, the transmitted signals may be position information of the flying bot 180 obtained from the bot communication unit 184.

Figure 2A:
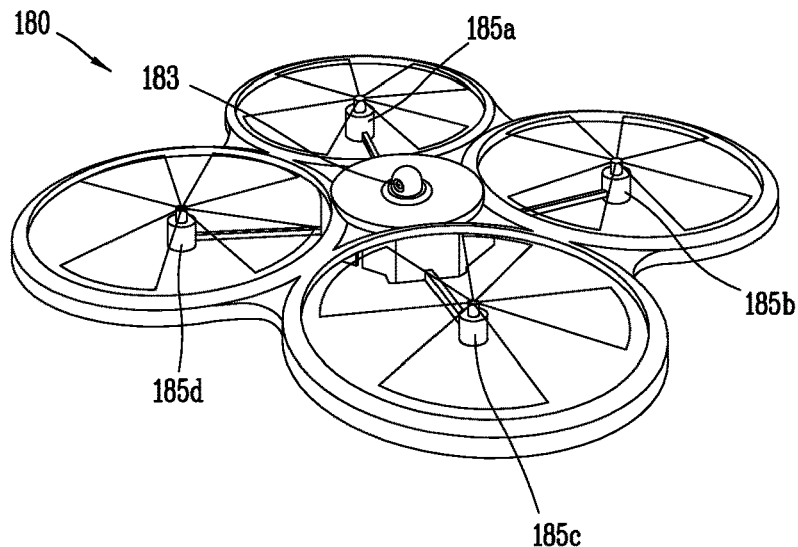
FIGS. 2A, 2B, and 2C are conceptual views illustrating an example of a flying bot control device and a flying bot according to an embodiment of the present disclosure.
Figure 2B:
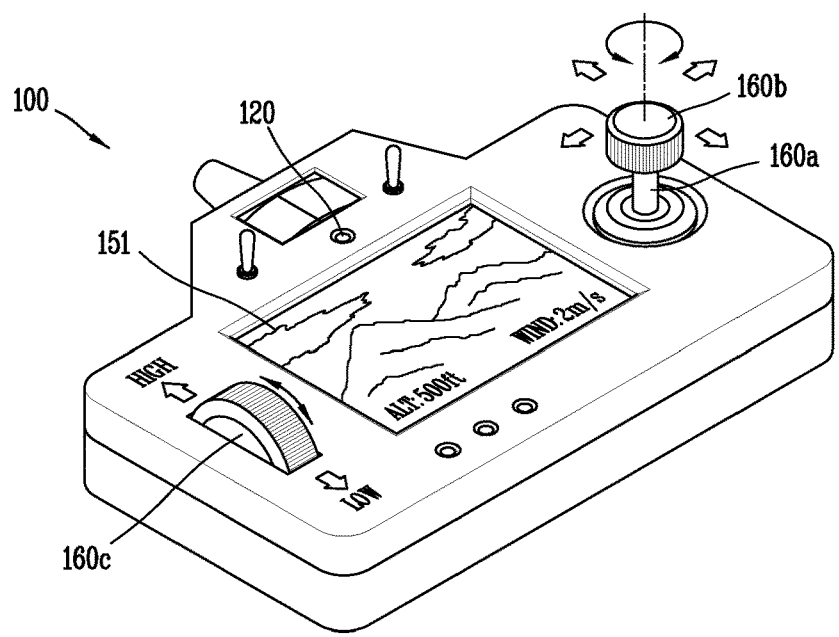
Figure 2C:
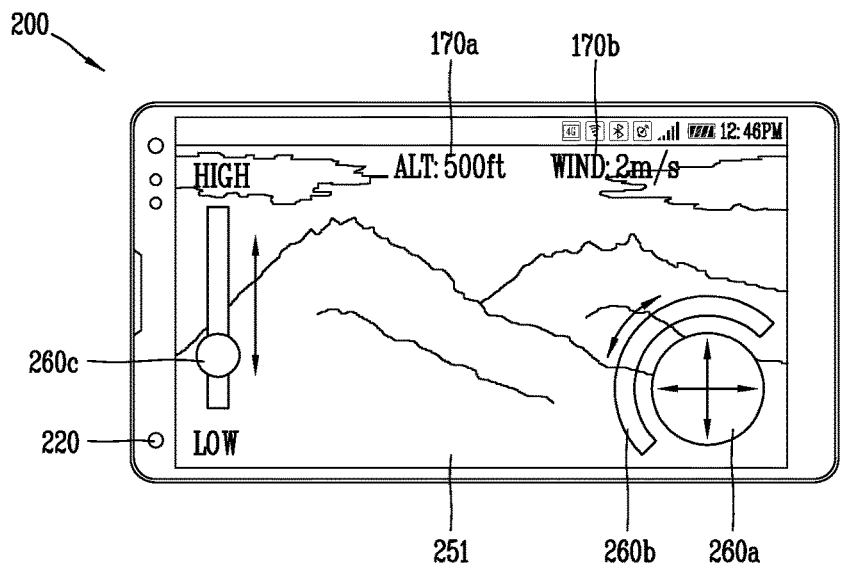

Meanwhile, FIGS. 2A, 2B, and 2C illustrate examples of the flying bot 180 and the control device 100 for controlling the flying bot 180 according to an embodiment in the present disclosure.

First, FIG. 2A illustrates an example of the flying bot 180 according to an embodiment of the present disclosure.

Referring to FIG. 2, the flying bot 180 according to an embodiment of the present disclosure may include at least one rotter 185a, 158b, 185c, and 185d and a bot camera 183. The bot controller 182 of the flying bot 180 may control driving of the rotters 185a, 158b, 185c, and 185d according to a control signal received from the flying bot control device 100 to rotate or move the flying bot 180 in a state of flying, or may enable the flying bot 180 to fly in a state of being tilted at a predetermined angle or greater.

Also, the bot controller 182 may capture various sensing values regarding a surrounding environment using various provided sensors and the bot camera 183 and capture an image through the bot camera 183. Here, two or more bot cameras 183 may be provided, and in this case, the bot controller 182 may simultaneously capture images received in at least two directions. Also, when at least two bot cameras 183 are provided, the bot controller 182 may determine any one of the at least two bot cameras 183 as a main camera and determine a direction for the flying bot 180 to move according to a direction in which the bot camera 183 designated as the main camera is oriented.

Meanwhile, FIG. 2A illustrates an example in which the flying bot 180 includes four rotters, but the flying bot applicable to the present disclosure may have greater or fewer rotters and may use a scheme other than the rotter scheme, for example, a jet propulsion scheme.

Meanwhile, FIGS. 2B and 2C illustrate various examples of implementing the flying bot control device 100 according to an embodiment of the present disclosure.

FIG. 2B illustrates an example of the flying bot control device 100 according to an embodiment of the present disclosure. Referring to FIG. 2B, the flying bot control device 100 may include a display unit 151, a camera, and keys 160a, 160b, and 160c of at least one user input unit for receiving a signal for controlling the flying bot 180. Here, the keys 160a, 160b, and 160c may be a movement key 160a for controlling a movement direction of the flying bot 180, a rotation key 160b for controlling a tilt state or a rotational state of the flying bot 180, and an altitude key 160c for controlling an altitude of the flying bot 180. The present disclosure is not limited to the keys 160a, 160b, and 160c illustrated in FIG. 2B and may include greater or fewer keys.

Meanwhile, the controller 110 may display various types of image information for controlling the flying bot 180 on the display unit 151. For example, the controller may display an image captured by the bot camera 183 of the flying bot 180 and sensing values sensed by various sensors of the flying bot 180, for example, an altitude (ALT) 170a, wind velocity 170b, and the like, on the display unit 151. Also, the controller 110 may recognize the user's eyes and switch a flight control mode of the flying bot 180 on the basis of a time duration in which the user's eyes are recognized. The flying bot control device 100 according to an embodiment of the present disclosure may use various units for sensing the user's eyes. For example, the flying bot control device 100 may use the camera 120 as a unit for recognizing the user's eyes, and the controller 110 may detect the user's eyes gazing at the flying bot control device 100 according to an embodiment of the present disclosure and a time duration in which the user gazes at the flying bot control device 100 from the image received through the camera 120.

For example, the controller 110 may determine a movement direction or a rotational direction of the flying bot 180 according to a flight control mode of the flying bot 180 determined from a result of recognizing the user's eyes or from a position or a state of the flying bot 180. That is, the controller 110 may determine a movement direction and/or a rotational direction of the flying bot 180 in accordance with an input of the movement key 160a with respect to a direction in which the bot camera 183 of the flying bot 180 is oriented, a location of the user, or four reference directions (four cardinal points, i.e., north, south, east, and west) on the basis of a currently set flight control mode.

Meanwhile, as illustrated in FIG. 2B, the flying bot control device 100 according to an embodiment of the present disclosure may be separately devised to control the flying bot 180 or may be implemented in the form of an application or a program installed in a mobile terminal such as a smartphone. In this case, when the application or the program is driven, the smartphone may operate as the flying bot control device 100 according to an embodiment of the present disclosure to control the flying bot 180.

FIG. 2C is a view illustrating an example of a smartphone 200 in which an application or a program is driven when the flying bot control device 100 according to an embodiment of the present disclosure is implemented in the form of the application or the program.

Referring to FIG. 2, when a flying bot control application or program according to an embodiment of the present disclosure is executed, a controller of the smartphone 200 may display various types of image information for controlling the flying bot 180 through the display unit 251 of the smartphone 200. For example, the controller of the smartphone 200 may display various graphic objects 260a, 260b, and 260c for controlling a flying state of the flying bot 180 on the display unit 251.

The graphic objects may be a first virtual key 260a corresponding to the movement key 160a for controlling a movement direction of the flying bot 180, a second virtual key 260b corresponding to a rotation key 160b for controlling a rotational direction or a tilt state of the flying bot 180, and a third virtual key 260c corresponding to an altitude key 160c for controlling an altitude of the flying bot 160. These keys are provided to help understanding of the present disclosure and the present disclosure is not limited thereto. The controller of the smartphone 200 may display greater or fewer virtual keys for controlling bot 180 on the display unit 251.

Meanwhile, when the flying bot control application or program is executed, the controller of the smartphone 200 may recognize the user's eyes using a camera provided on a front side of the smartphone 200 and may change a flight control mode of the flying bot 180 on the basis of a time duration in which the user's eyes are recognized.

For example, the controller of the smartphone 200 may determine a movement direction or a rotation direction of the flying bot 180 according to a result of recognizing the user's eyes or a flight control mode of the flying bot 180 determined from a position or a state of the flying bot 180. That is, the controller of the smartphone 200 may determine a movement direction and/or a rotational direction of the flying bot 180 in accordance with an input of the virtual key 260a with respect to a direction in which the bot camera 183 of the flying bot 180 is oriented, a location of the user, or four reference directions (four cardinal points, i.e., north, south, east, and west) on the basis of a currently set flight control mode.

Also, the controller 110 of the smartphone 200 may display various types of image information related to a currently determined flight control mode on the display unit 251. For example, the controller of the smartphone 200 may display an image captured by the bot camera 183 and various sensing values sensed by various sensors of the flying bot 180 on the display unit 251.

Meanwhile, in the above, the flying bot control device 100 separately devised to control the flying bot 180 and the smartphone 200 in which an application or a program for controlling the flying bot 1800 according to a flying bot control method according to an embodiment of the present disclosure is driven are distinguishably described. Hereinafter, it is assumed that the flying bot control device 100 according to an embodiment of the present disclosure is the application or program driven in the smartphone 200. In this case, the smartphone 200 may be the flying bot control device 100 according to an embodiment of the present disclosure, and the controller, the display unit 251, and the camera 220 of the smartphone 200 may be driven as the controller 110, the display unit 151, and the camera 120 of the flying bot control device 100 according to an embodiment of the present disclosure.

Hereinafter, embodiments related to a control method that may be implemented in the flying bot control device 100 configured as described above will be described with reference to the accompanying drawings. The above-described embodiments are results in which the elements and characteristics of the present invention are combined in a specific form. Each of the element or characteristics has to be considered as being optional unless otherwise explicitly described.

Figure 3:
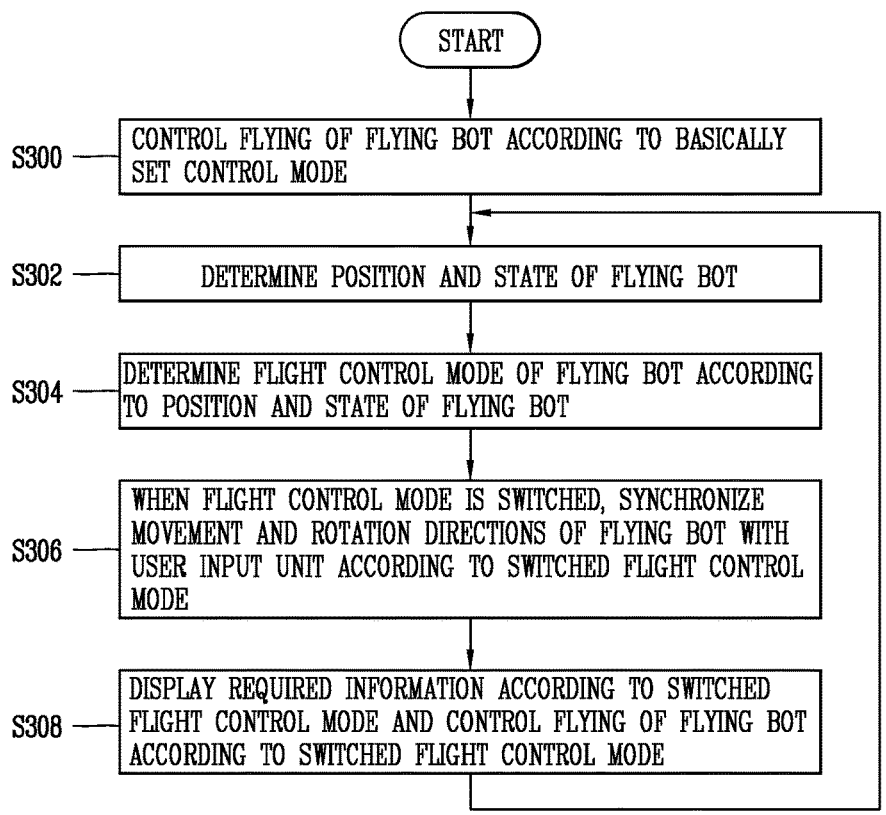
FIG. 3 is a flow chart illustrating an operational process of controlling flying of a flying robot by a flying bot control device according to an embodiment of the present disclosure.

FIG. 3 is a flow chart illustrating an operational process of controlling flying of a flying robot by a flying bot control device according to an embodiment of the present disclosure.

Referring to FIG. 3, when the flying bot 180 is driven, the controller 110 of the flying bot control device 100 according to an embodiment of the present disclosure may control flying of the flying bot 180 according to an initially set control mode (S300). The initially set control mode may be determined by the user in advance or may be determined in advance when the flying bot 180 and the flying bot control device 100 are released. Or, the initially set control mode may be determined according to positions of the flying bot 180 and the flying bot control device 100.

Preferably, the initially set basic control mode may be a third person control mode. This is because, when the flying bot 180 starts to be driven, the flying bot 180 may be highly likely to be in a state of being positioned within a range of the user's vision and when the bot camera 183 is close to the ground, a visual field may be limited. Thus, the user may conveniently enable the flying bot 180 to take off, while checking the flying bot 180 and a surrounding situation of the flying bot 180, such as an obstacle, or the like, from a point of view of a third person.

Meanwhile, when the flying bot 180 starts to fly, the bot controller 182 of the flying bot 180 may transmit pieces of information obtained by sensing various surrounding situations to the flying bot control device 100. Here, the pieces of information received from the flying bot 180 may include a sensing value sensed from the sensors of the flying bot 180 or information regarding a position of the flying bot 180. Here, the controller 110 of the flying bot control device 100 may determine a position and a state of the flying bot 180 from the pieces of received information (S302).

Meanwhile, the controller 110 may determine a flight control mode of the flying bot 180 on the basis of at least one of the position and the state of the flying bot 180 determined in step S302. Or, the controller 110 may determined a flight control mode of the flying bot 180 according to a result of sensing a time duration in which the user gazed the flying bot control device 100.

For example, when the user's eyes are sensed through the camera 120, the controller 110 may measure a time duration in which the user's eyes are sensed. Also, when the measured time duration is equal to or longer than a preset time duration, the controller 110 may change a flight control mode of the flying bot 180. In this case, the controller 110 may change a control mode of the flying bot 180 to a first person control mode in which the flying bot 180 is controlled at a point of view of the flying bot 180.

Meanwhile, the controller 110 may detect a distance between the flying bot 180 and the flying bot control device 100 from a position of the flying bot 180, and determine a flight control mode more appropriate for the current flying bot 180 on the basis of the detected distance (S304). Or, the controller 110 may determine the flight control mode of the flying bot 180 on the basis of strength of a signal received from the flying bot 180. Hereinafter, an example of an operational process of step S304 to determine a flight control mode of the flying bot 180 according to a result determined in step S304 will be described in detail with reference to FIG. 5.

Meanwhile, when the flight control mode of the flying bot 180 determined in step S304 is different from a currently set flight control mode, the controller 110 may recognize that the flight control mode has been changed. In this case, the controller 110 may synchronize a movement direction and a rotational direction of the flying bot 180 to each key of the user input unit 160 according to the changed flight control mode.

In this case, the controller 110 may determine front, rear, left, and right directions of the flying bot 180 according to a currently determined flight control mode. For example, when the flight control mode of the flying bot 180 is changed to a first person control mode, the controller 110 may determine a direction in which the bot camera 183 is oriented in the flying bot 180 is a "front direction", and determine a rear side, a left side, and a right side on the basis of the determined front side. Also, the controller 110 may synchronize the determined directions and the movement key 160*a* among keys of the user input unit 160.

Also, in step S306, the controller 110 may transmit a signal for controlling sensors for sensing a motion, an inertia, and a rotation of the flying bot 180, that is, a motion sensor, an inertial sensor, and a gyroscope sensor, to the flying bot 180 such that a rotational state and a tilt state of the flying bot 180 is synchronized in relation to the determined front side. Accordingly, a rotational direction and a tilt state, as well as a movement direction of the flying bot 180 may be synchronized with keys of the user input unit 160 according to the currently changed flight control mode.

Meanwhile, in the above, only the first person control mode is mentioned, but the change different flight control mode may also be the same. For example, when the flight control mode is switched to a third person control mode or a position designation mode, the controller 110 may determine front, rear, left, and right directions of the flying bot 180 accordingly. For example, when the flight control mode is switched to the third person control mode, the controller 110 may determine the directions on the basis of a position of the flying bot 180 and the user, i.e., the flying bot control device 100. In this case, the controller 110 may determine a direction in which the flying bot control device 100 is oriented from the flying bot 180 as a "rear direction" and determine an opposite direction as a "front direction". Also, the controller 110 may determine a "left side" and a "right side" with respect to the determined "front direction" and the "rear direction". Also, the controller 110 may synchronize the determined directions and the movement key 160*a* among the keys of the user input unit 160.

Meanwhile, when a flight control mode of the flying bot 180 is switched to a position designation mode, the controller 110 may determine the directions on the basis of four reference directions (four cardinal points, i.e., north, south, east, and west). In this case, the controller 110 may set a direction in which the movement key 160*a*, among the keys of the user input unit 160, is oriented as four reference directions (i.e., north, south, east, and west). and transmit a signal for controlling a movement direction, a rotational direction, and a tilt state of the flying bot 180 according to a user's key input to the flying bot 180.

FIGS. 4A to 4D are conceptual views illustrating an example of controlling movement of a flying bot according to a flight control mode of a flying bot control device according to an embodiment of the present disclosure.

Figure 4A:
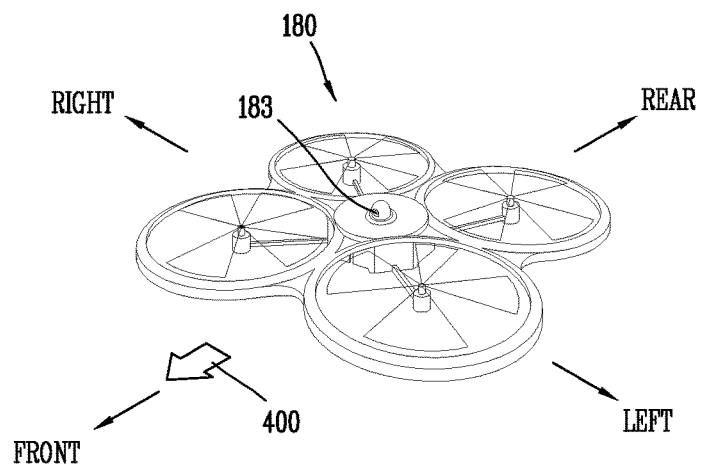
FIGS. 4A to 4D are conceptual views illustrating an example of controlling movement of a flying bot according to a flight control mode of a flying bot control device according to an embodiment of the present disclosure.

First, FIG. 4A illustrates an example in which directions of the flying bot 180 are determined when a flight control mode of the flying bot 180 is a first person control mode. As illustrated in FIG. 4A, in the case of the first person control mode, a direction 400 in which the bot camera 183 is oriented may be a front side of the flying bot 190, based on which other directions (rear, left, and right sides) may be determined. Also, a rotational direction and a tilt state of the flying bot 180 may be determined accordingly.

Figure 4B:
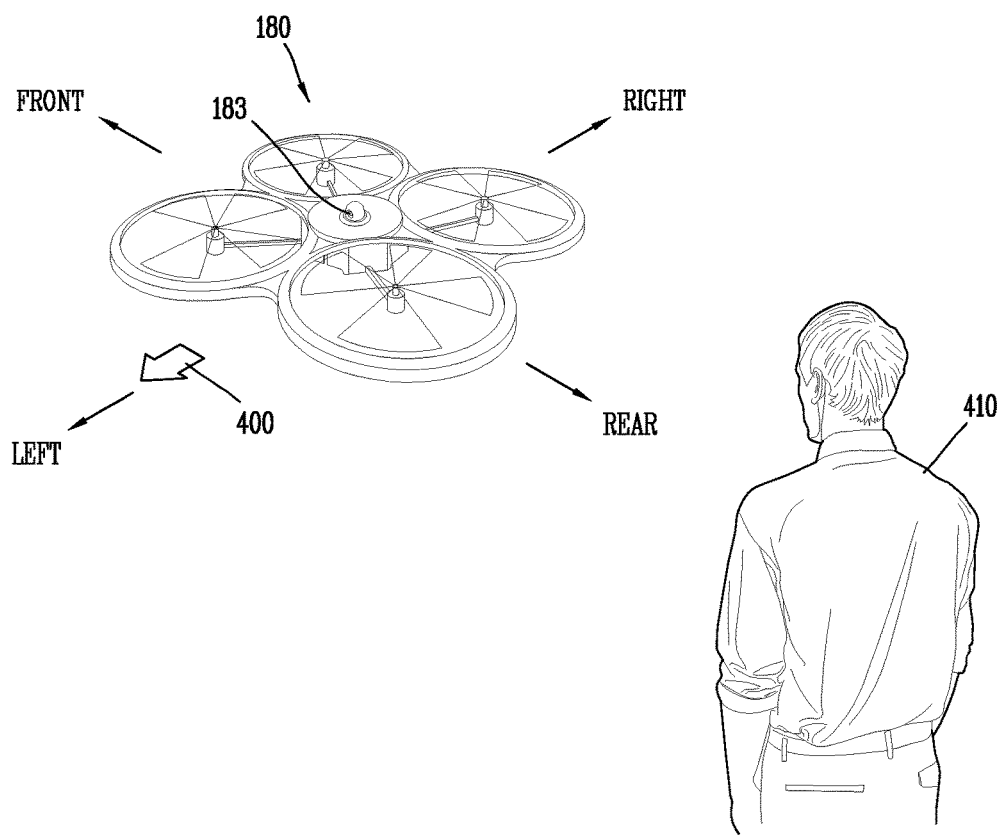

FIG. 4B illustrates an example in which directions of the flying bot 180 are determined when a flight control mode of the flying bot 180 is a third person control mode. Here, the third person control mode may be a flight control mode in which the user controls a flying state of the flying bot 180, while observing the flight bot 180 with his naked eyes.

Accordingly, front, rear, left and right sides of the flying bot 180 may be determined according to a direction in which the user, i.e., the flying bot control device 100, is positioned. Here, as illustrated in FIG. 4B, the controller 110 may determine a direction in which the flying bot 180 is oriented to be close to the user, i.e., a direction in which the flying bot control device 100 is positioned, as a "rear side" of the flying bot 180. Also, conversely, a direction in which the flying bot 180 is oriented to become away from the user, i.e., a direction opposite to the direction in which the flying bot control device 100 is positioned, as a "front side". Also, left and right sides may be determined according to the determined direction. In this case, a direction different from the direction in which the bot camera 183 of the flying bot 180 is oriented may be determined as a front direction of the flying bot 180, and accordingly, an image of a direction, not a front direction of the flying bot 180, may be captured through the bot camera 183.

Figure 4C:
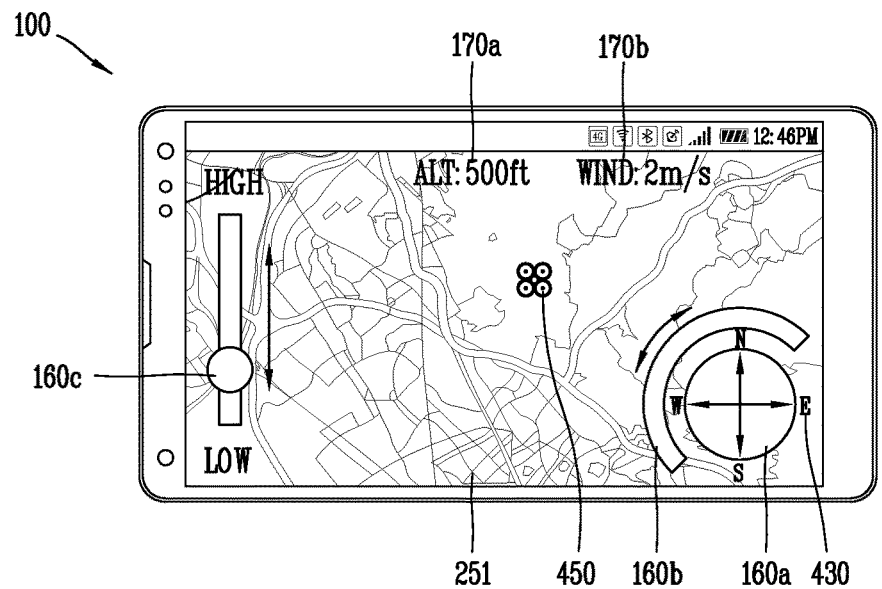
Figure 4D:
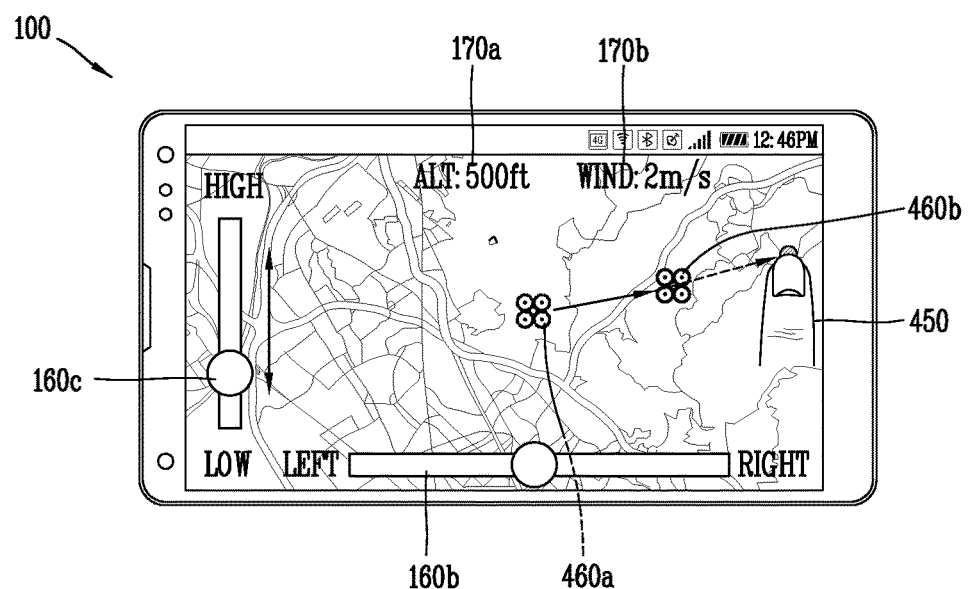

Meanwhile, FIGS. 4C and 4D illustrate examples of a case in which a flight control mode of the flying bot 180 is a position designation mode. As illustrated in FIGS. 4C and 4D, in the position designation mode a current position of a flying bot 450 on a map may be displayed.

In this case, as illustrated in FIG. 4C, the controller 110 may synchronize each direction corresponding to the movement key 160a of the user input unit 160 to four reference directions. Here, the controller 110 may determine a movement direction of the flying bot 180 on the basis of each of four reference directions according to a user input regarding the movement key 160a.

Meanwhile, in the case of the position designation mode, the controller 110 may detect a user's touch input for designating a specific position of map information displayed on the display unit 151. That is, as illustrated in FIG. 4D, when the user applies a touch input to a specific point of the display unit 151 displaying map information, the controller 110 may recognize the touch input as a user's input for moving the flying bot to a position on the map corresponding to the point to which the touch input has been applied.

Accordingly, the controller 110 may transmit a control signal for moving the flying bot 180 to the designated position. Thus, the flying bot 180 may be moved from an existing position 460a, and here, a position 460b in which the flying bot 180 is moved may be displayed on the display unit 151.

Meanwhile, when the flight control mode is determined as the position designation mode, the controller 110 may display a location of the user on the display unit 151. Here, when a touch input is sensed at a point of the display unit 151 where a location of the is displayed, the controller 110 may transmit a control signal for the flying bot 180 to be returned to the user. In this case, the controller 110 may cause the flying bot 180 to be moved along a path along which the flying bot 180 has moved to the current position, and accordingly, the flying bot 180 may be moved along the path along which the flying bot 180 has moved, as is, so as to be returned to the user.

Meanwhile, even when the flying bot 180 is driven in the position designation mode, the flying bot 180 may detect an adjacent obstacle. In this case, the flying bot 180 may detect a position and a direction of the sensed obstacle, and a distance to the obstacle from the flying bot 180, and transmit the sensed information to the flying bot control device 100. Also, in this case, the information regarding the detected obstacle, i.e., the information regarding the position and direction of the obstacle and the distance to the obstacle, on the display unit 151 of the flying bot control device 100.

Meanwhile, when the flight control mode of the flying bot 180 is switched in step S306, the controller 110 may inform the user about the switch through image information displayed on the display unit 151 or audio information output through the audio output unit 150. Also, when the user approves the switch of the flight control mode, the controller 110 may switch the flight control mode.

Meanwhile, when the flight control mode is switched in step S306, the controller 110 may provide information required according to the switched flight control mode to the user (S308). For example, as illustrated in FIG. 4A, when the flight control scheme is a first person control mode, the controller 110 may display an image received from the bot camera 183 of the flying bot 180 on the display unit 151. Also, when the flight control scheme is a position designation mode, the controller 110 may display a current position of the flying bot 180 on the map on the display unit 151. Also, the controller 110 may display a state (e.g., a meteorological state) around the flying bot 180.

The controller 110 may determine a position and a state of the flying bot 180 on the basis of information received from the flying bot 180 in step S302. The controller 110 may determine a flight control mode of the flying bot 180 in step S304, and may perform step S306 and S308 again according to a determination result of step S304.

In this manner, since the flight control mode of the flying bot 180 is determined according to various positions and states of the flying bot 180, the controller 110 may allow the user to control the flying bot 180 by intuition. Also, when a flight control mode of the flying bot 180 is switched, since controller 110 displays information required for the user to control the flying bot 180 on the display unit 151, the user may more conveniently control the flying bot 180.

FIG. 5 specifically illustrates an operational process of determining a flight control mode of a flying bot according to a position and a state of the flying bot during the operational process illustrated in FIG. 3.

In step S304, the flying bot control device 100 according to an embodiment of the present disclosure may determine a flight control mode of the flying bot 180 on the basis of a position and/or state of the flying bot 180. Conditions under which a flying state of the flying bot 180 is determined may be various. For example, the controller 110 of the flying bot control device 100 may switch a flight control mode of the flying bot 180 on the basis of a distance between the flying bot 180 and the flying bot control device 100 and strength of a signal transmitted from the flying bot 180. FIG. 5 illustrates an example of switching a flight control mode of the flying bot 180.

Referring to FIG. 5, when various types of information regarding a current situation of the flying bot 180 are transmitted from the flying bot 180 in step S302, the controller 110 of the flying bot control device 100 according to an embodiment of the present disclosure may detect a position of the flying bot 180 from the transmitted information. Also, the controller 110 may detect a distance between the flying bot 180 and the flying bot control device 100 from the detected position of the flying bot 180.

The controller 110 may determine whether the distance between the flying bot 180 and the flying bot control device 100 is equal to or greater than a preset first distance (S500). Here, the first distance may be a distance over which the user may be able to observe the flying bot 180 with his naked eyes. That is, when the distance between the flying bot 180 and the flying bot control device 100 is smaller than the preset first distance, the user may observe the flying bot 180 with his naked eyes, and thus, the flying bot 180 may be controlled in the third person control mode.

Meanwhile, although a distance between the user, i.e., the flying bot control device 100, and the flying bot 180 is smaller than the preset first distance, if an obstacle is present between the flying bot 180 and the user, the user may not be able to observe the flying bot 180 with his naked eyes. In this case, the controller 110 may use various methods depending on whether an obstacle is present between the flying bot 180 and the user. For example, the controller 110 may detect whether an obstacle is present in the vicinity of the flying bot 180 through the bot controller 182 of the flying bot 180 or may detect whether an obstacle is present between the flying bot 180 and the user by determining strength of a signal transmitted from the flying bot 180 on the basis of a distance to the flying bot 180.

To this end, when a distance between the flying bot 180 and the user is smaller than a preset first distance in step S500, the controller 110 may determine whether strength of a signal transmitted from the flying bot 180 is lower than a lower limit value of a predetermined range determined on the basis of a reference value (S502). Here, the reference value for determining strength of the signal may be determined according to a distance between the flying bot 180 and the user. That is, as the distance between the flying bot 180 and the user is increased, the reference value may be a strength value of a weaker signal, and as the distance therebetween is reduced, the reference value may be a strength value of a stronger signal. In this case, the controller 110 may set a predetermined range from the reference value in consideration of an influence of weather, a surrounding environment, and the like, and may determine whether strength of the transmitted signal is lower than the lower limit (a preset level) of the predetermined range set on the basis of the reference value.

When it is determined that strength of the signal transmitted from the flying bot 180 is not lower than the lower limit (a preset level) of the predetermined range determined on the basis of the reference value in accordance with the distance to the flying bot 180 in step S502, the controller 110 may determine that the user may observe and control the flying bot 180 with his naked eyes. Thus, the controller 110 may determine a flight control mode to a third person control mode (S504). Also, when the currently set flight control mode of the flying bot 180 is not the third person control mode, the controller 110 may allow the user to select whether to switch a flight control mode of the flying bot 180 to the third person control mode, or may switch the control mode and inform the user accordingly. Also, the controller 110 may provide pieces of information required for controlling the flying bot 180 to the user according to the switched flight control mode.

Meanwhile, when the distance between the flying bot 180 and the user is equal to or greater than the preset first distance according to the determination result of step S500, the controller 110 may determine that it is not possible to control the flying bot 180, while the user is observing the flying bot 180 with his naked eyes. Or, when it is determined that the strength of signal transmitted from the flying bot 180 is lower than the lower limit value of the predetermined range in step S502, the controller 110 may recognize that an obstacle is present between the flying bot 180 and the user. In this manner, when it is determined that it is impossible for the user to control the flying bot 180 with his naked eyes in step S500 or it is determined that an obstacle is present between the flying bot 180 and the user in step S502, the controller 110 may determine a flight control mode of the flying bot 180 to a first person control mode in which the flying bot 180 may be controlled from a point of view of the bot camera 183 of the flying bot 180.

In this case, when a current flight control mode of the flying bot 180 is not the first person control mode, the controller 110 may allow the user to selectively switch the flight control mode, or may display a switched flight control mode to the user. Also, the controller 110 may provide information required for controlling the flying bot 180 according to the switched flight control mode to the user. Here, the information required for controlling the flying bot 180 may be an image received from the bot camera 183 of the flying bot 180.

Meanwhile, when it is determined that it is not adequate to control the flying bot 180 in the first person control mode, or according to a user selection, a flight control mode of the flying bot 180 may be switched to a position designation mode. For example, in cases where the flying bot 180 flies for a long distance by a preset level or greater set by the user, the controller 110 may determine that the first person control mode is not appropriate as a flight control mode. Here the controller 110 may display a current position of the flying bot 180 on the map and allow the user to designate a position to which the flying bot 180 is to be moved on a specific map or may determine a flight control mode as the position designation mode in which a movement direction of the flying bot 180 may be received.

That is, when a distance between the flying bot 180 and the user is equal to or greater than a preset first distance, the controller 110 may determine a flight control mode of the flying bot 180 to the position designation mode or the first person control mode. Also, when a distance between the flying bot 180 and the user is equal to or greater than a preset second distance, it may be determined that a position designation mode, instead of the first person control mode, is appropriate. Here, the first distance may be shorter than the second distance. Thus, when the distance between the flying bot 180 and the user is equal to or greater than the first distance and smaller than the second distance, the controller 110 may determine a flying control mode of the flying bot 180 to the first person control mode.

Meanwhile, although the flight control mode of the flying bot 180 is determined to be the third person control mode or the position designation mode according to the determination result of step S304, the controller 110 may switch the flight control mode on the basis of a surrounding situation of the flying bot 180. For example, when an obstacle is present in the vicinity of the flying bot 180 according to a detection result of the bot sensing unit 186 of the flying bot 180, or when a meteorological environment is bad (when a wind velocity is equal to or higher than a predetermined level or when it rains, etc.), the controller 110 may switch a flight control scheme of the flying bot 180 accordingly.

In this case, the controller 110 may switch a control mode of the flying bot 180 to the first person control mode. In the case of the first person control mode, the user may control the flying bot 180 from a point of view of the flying bot 180, so that the user may more promptly cope with various dangerous factors such as a collision, or the like. Also, in cases where the flying bot 180 is controlled in the first person control mode, when an obstacle is detected, the controller 110 may display the detected obstacle on the display unit 151. For example, the controller 110 may display an obstacle access warning by vibrations or a specific audio signal. Also, when the obstacle access warning is displayed through the display unit 151, the controller 110 may display a direction in which the obstacle is positioned and display the obstacle access warning by a graphic object in different colors and/or forms according to a distance between the obstacle and the flying bot 180.

Meanwhile, the flying bot control device 100 according to an embodiment of the present disclosure may control a flying state of the flying bot 180 according to a function performed in the flying bot 180. For example, the controller 110 of the flying bot control device 100 may differentiate a flying state of the flying bot 180 according to an image capture scheme of the flying bot 180.

Figure 6:
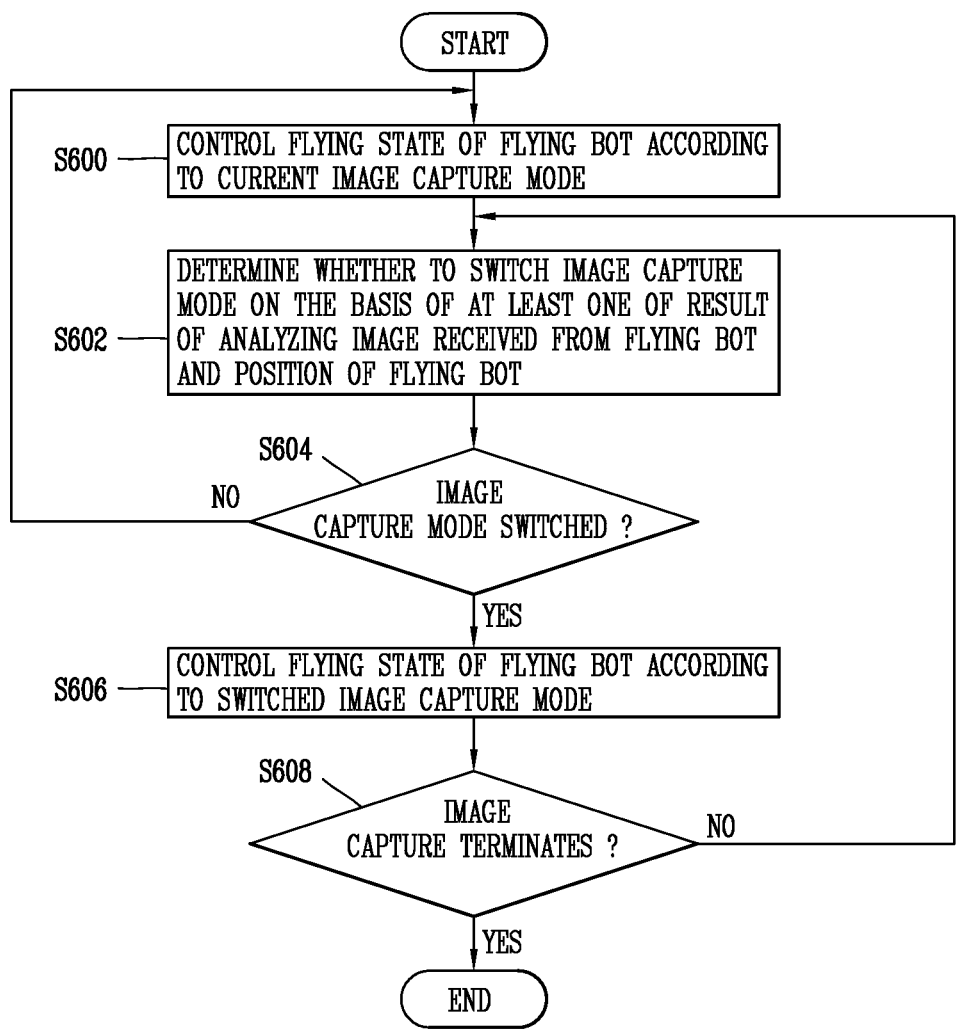
FIG. 6 is a flow chart illustrating an operational process of controlling a flying state of a flying bot according to a currently selected image capture mode by a flying bot control device according to an embodiment of the present disclosure.

FIG. 6 is a flow chart illustrating an operational process of controlling a flying state of the flying bot 180 according to a currently selected image capture mode by the flying bot control device 100 according to an embodiment of the present disclosure.

Referring to FIG. 6, the flying bot control device 100 according to an embodiment of the present disclosure may drive the bot camera 183 of the flying bot 180 according to a user selection, and may control a flying state of the flying bot 180 such that an image sensed by the camera sensor of the bot camera 183 is captured as video or a still image according to various preset image capture modes (S600). For example, such image capture modes may include a general image capture mode, a panorama image capture mode, and the like, and the flying bot 180 may fly in different forms according to the image capture modes and store images in different forms.

In general, the panorama image capture mode may be an image capture mode in which a plurality of images are continuously connected to each other in a horizontal direction to form a horizontally continuous large landscape image (panorama image). Meanwhile, in the general image capture mode, the flying bot 180 may rotate in a specific direction according to a control signal from the user to capture an image received from the bot camera 183, without having to fixate an image capture direction of the bot camera 183.

According to the image capture mode of the flying bot 180, the flying bot control device 100 may control a flying state of the flying bot 180 differently. For example, when a current image capture mode is the panorama image capture mode, in order to capture a panorama image, the controller 110 may fly in a state in which an image capture direction of the bot camera 183 is fixated, to capture a plurality of continuous images regarding a specific direction of the flying bot 180. Or, when the image capture mode is the general image capture mode, the controller 110 may rotate the flying bot 180 to receive an image in a direction desired by the user according to control of the user, and capture an image received from the bot camera 183.

Figure 7A:
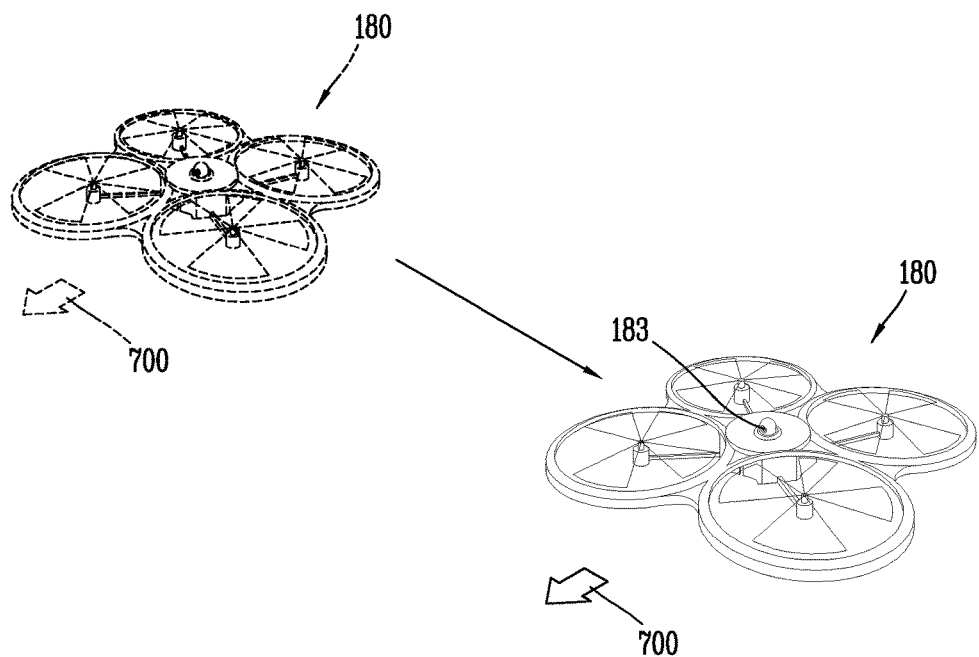
FIGS. 7A and 7B are views illustrating an example in which a flying state of a flying bot is differently controlled according to an image capture mode.
Figure 7B:
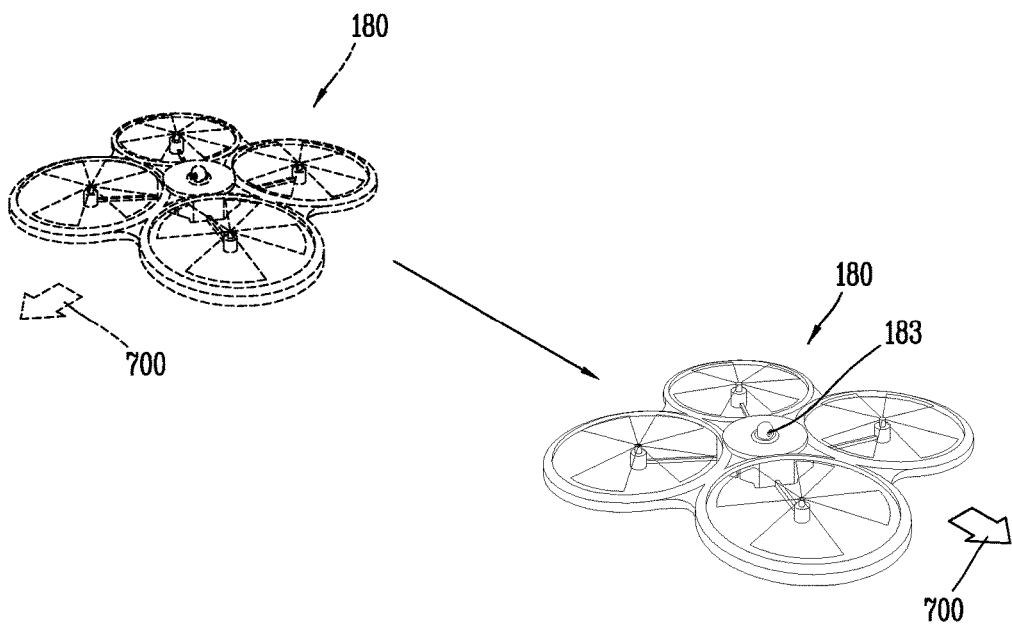

FIGS. 7A and 7B are views illustrating an example in which a flying state of a flying bot is controlled according to an image capture mode.

First, FIG. 7A illustrates an example of a state in which the flying bot 180 is moved in the panorama image capture mode.

As illustrated in FIG. 7A, when the flying bot 180 is driven in the panorama image capture mode, the bot controller 182 moves the flying bot 180 in a state in which a direction 700 in which the bot camera 183 is oriented is fixated, under the control of the flying bot control device 100, so that continuous images of the direction 700 in which the bot camera 183 is oriented are captured according to a movement position of the flying bot 180. In this case, the flying bot control device 100 may generate a panorama image by continuously connecting a plurality of images received from the flying bot 180 in a horizontal direction, and output the generated panorama image through the display unit 151.

FIG. 7B illustrates an example of a state in which the flying bot 180 is moved in the general image capture mode.

In the case of the genera image capture mode, the bot controller 182 may not need to capture a plurality of continuous images as in the panorama image capture mode. Thus, as illustrated in FIG. 7B, the bot controller 182 may rotate the flying bot 180 in a movement direction according to control of the flying bot control device 100, and accordingly, a direction in which the bot camera 183 is oriented is varied. Thus, before and after movement, the bot camera 183 may capture images of different directions, and the flying bot control device 100 may receive the captured image on the display unit 151.

Meanwhile, the image capture mode may be directly selected by the user or may be automatically selected on the basis of a preset condition. For example, the controller 110 of the flying bot control device 100 may determine a more appropriate image capture mode on the basis of a result of analyzing an image received from the flying bot 180 (S602). For example, the controller 110 analyzes a background of the received image, and when the background of the image is a horizontal line or the sky, the controller 110 may switch the image capture mode to the panorama image capture mode. Or, the controller 110 may determine a more appropriate image capture mode on the basis of a position of the flying bot 180, as well as on the basis of a result of analyzing the received image. For example, when the flying bot 180 is positioned at an altitude of a predetermined level or higher, or when the flying bot 180 is present in a specific place such as the sea on a map, the controller 110 may switch the image capture mode to the panorama image capture mode on the basis of the position of the flying bot 180 (S602).

Or, in cases where many obstacles are included in the image or in cases where many obstacles are present in the vicinity of the flying bot 180 according to a result of analyzing the received image, the controller 110 may switch the image capture mode of the flying bot 180 to the general image capture mode. This is to control the flying bot 180 from a point of view of the flying bot 180 by switching a flight control mode of the flying bot 180 to the first person control mode when many obstacles are present. Or, when a flight control mode of the flying bot 180 is switched to the first person control mode by the user or on the basis of a preset condition, the image capture mode of the flying bot 180 may be switched to the general image capture mode. This is because, in the case of the panorama image capture mode, a direction of the bot camera 183 may be fixated.

The controller 110 may determine whether a currently set image capture mode has been switched according to a result of determining an image capture mode in step S602 (S604). Also, when the image capture mode has not been switched according to the determination result of step S604, the controller 110 controls a flying state of the flying bot 180 according to a currently set image capture mode and controls the flying bot 180 to capture an image received from the bot camera 183 in step S600. However, when the image capture mode has been switched according to a determination result of step S604, the controller 110 controls a flying state of the flying bot 180 according to the currently switched image capture mode and controls the flying bot 180 to capture an image received from the bot camera 183.

The controller 110 may detect whether image capture termination of the flying bot 180 is selected (S608). For example, when the user selects image capture termination, the controller 110 may terminate image capturing in the flying bot 180. However, when a current flight control mode of the flying bot 180 is the first person control mode, the controller 110 may receive an image sensed by the bot camera 183 and display the received image on the display unit 151 of the flying bot control device 100, regardless of whether the user terminates image capturing. That is, in the case of the first person control mode, when the image capture mode is terminated, the controller 110 may not separately store an image sensed by the bot camera 183 in the memory 170 and control the bot camera 183 to continuously operate, However, when image capturing of the flying bot 180 is not terminated according to a detection result of step S608, the controller 110 may determine whether to switch the image capture mode of the flying bot 180 in step S602. Also, the controller 110 may perform step S600 to step S602 according to whether the image capture mode has been switched in step S604. Or, the controller 110 may perform again an operational process of step S606 and step S608 according to a determination result of step S604.

Figure 8:
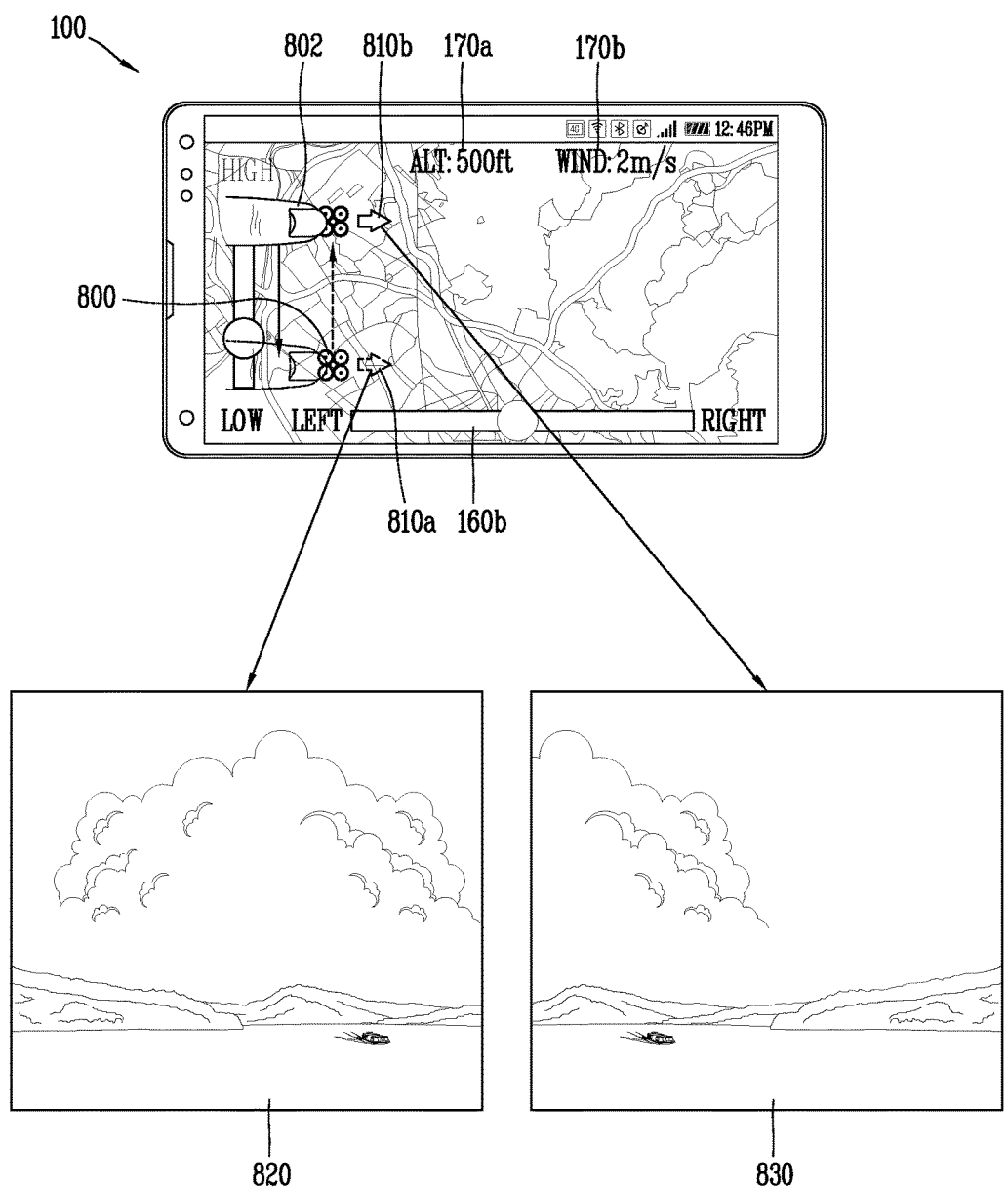
FIG. 8 is a view illustrating an example of movement of a flying bot and images captured according to the movement of the flying bot, in a flying bot control device according to an embodiment of the present disclosure.

Meanwhile, even when the flying bot 180 operates in the position designation mode, the flying bot control device 100 according to an embodiment of the present disclosure may capture an image according to the panorama image capture mode. FIG. 8 is a view illustrating an example of movement of a flying bot and images captured according to the movement of the flying bot, in a flying bot control device according to an embodiment of the present disclosure.

Referring to FIG. 8, when the flying bot 180 operates in the position designation mode, the controller 110 may determine movement of the flying bot 180 according to a user's touch input sensed on the display unit 151. The user's touch input may be a touch applied to a specific point or may be a touch-and-drag input.

Here, as illustrated in FIG. 8, the user may apply a touch input to a point of a display unit 151 displaying a current position 800 of the flying bot 180, and drag the touch input. In this case, the flying bot 180 may move to the position 802 to which the touch input has been dragged. In this state, when image capturing of the flying bot 180 is selected, the controller 110 may display a direction in which the bot camera 183 provided in the flying bot 180 is oriented, by using separate graphic objects (a first graphic object 810a and a second graphic object 810b).

In this state, the controller 110 may determine an image capture mode of the bot camera 183 on the basis of a user selection, a result of analyzing the image received from the bot camera 183, or a position of the flying bot 180. When the image capture mode is the panorama image capture mode, although the flying bot 180 moves in position, a direction in which the bot camera 183 is oriented may be in a fixated state as illustrated in FIG. 7A.

Thus, while the flying bot 180 is moving from the previous position 800 to the position 802 according to a touch-and-drag input, a direction of the bot camera 183 may be fixated and continuous images may be captured in the direction as indicated by the first graphic object 810a and the second graphic object 810b.

For example, the first image 820 of FIG. 8 may be an image captured when the flying bot 180 is in the previous position 800 and the second image 830 may be an image captured when the flying bot 180 is in the position 802 to which the flying bot 180 has been moved by the user's touch-and-drag input. Here, the controller 110 may receive the first image 820 and the second image 830 from the flying bot 180 and synthesize the received images to generate a panorama image, and the generated panorama image may be displayed on the display unit 151.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:
1. A flying bot control device comprising:
a communication unit performing wireless communication with a flying bot;
a display unit displaying image information related to control of the flying bot;
a user input unit controlling a flying state of the flying bot and a function which can be performed by the flying bot;
a detection unit detecting at least one of a rotation direction, a movement direction, or a tilt state of the flying bot; and
a controller receiving information regarding at least one of a position or a surrounding situation from the flying bot through the communication unit and switching a flight control mode of the flying bot on the basis of the received information,
wherein, according to the changed flight control mode of the flying bot, the controller determines a movement direction and a rotation direction of the flying bot in accordance with an input to the user input unit on the basis of a location of a user,
wherein when a result of sensing an obstacle adjacent to the flying bot is received from the flying bot, the controller displays information regarding the sensed obstacle on the display unit, and
wherein the controller displays a position and a direction of the obstacle using separate graphic objects, and the graphic objects are displayed in different colors or forms according to a distance between the flying bot and the sensed obstacle.

2. The flying bot control device of claim 1, wherein the controller measures a distance between the flying bot and the user from a position of the flying bot and determines the flight control mode of the flying bot according to the measured distance.

3. The flying bot control device of claim 2, wherein the controller switches the flight control mode of the flying bot to any one of a third person control mode in which the flying bot is controlled according to a result of observing the flying bot by the user with his naked eyes on the basis of the measured distance, a first person control mode in which the flying bot is controlled on the basis of a point of view of a camera installed in the flying bot, and a position designation mode in which the flying bot is controlled on the basis of a position of the flying bot on a map.

4. The flying bot control device of claim 3, wherein:
when the measured distance is smaller than a preset first distance, the controller determines the flight control mode of the flying bot to the third person control mode,
when the measured distance is equal to or greater than a preset second distance, the controller determines the flight control mode of the flying bot to the position designation mode, and
in other cases, the controller determines the flight control mode of the flying bot to the first person control mode.

5. The flying bot control device of claim 4, wherein when the measured distance is smaller than the preset first distance, the controller further measures strength of a signal transmitted from the flying bot and determines whether to change the flight control mode of the flying bot to the first person control mode according to whether the measured strength of the signal is equal to or higher than a lower limit value of a predetermined range set on the basis of a reference value determined according to the measured distance.

6. The flying bot control device of claim 3, wherein when a currently set flight control mode is the first person control mode, the controller displays an image received from the camera provided in the flying bot on the display unit, determines a direction in which the camera is oriented as a forward direction of the flying bot, determines backward, leftward, and rightward directions of the flying bot on the basis of the determined forward direction, and synchronizes the determined directions with keys for controlling the movement direction of the flying bot in the user input unit.

7. The flying bot control device of claim 3, wherein when a currently set flight control mode is the third person control mode, the controller determines a direction in which the user is positioned as a backward direction of the flying bot on the basis of a position of the flying bot, determines forward, leftward, and rightward directions of the flying bot on the basis of the determined backward direction, and synchronizes the determined directions with keys for controlling the movement direction of the flying bot in the user input unit.

8. The flying bot control device of claim 3, wherein when a currently set flight control mode is the position designation mode, the controller displays map information including information related to a current position of the flying bot on the display unit, and controls the flying bot to move on the basis of a user's touch input applied to the display unit.

9. The flying bot control device of claim 8, wherein the controller further displays information regarding a current position of the user on the map information, and when a touch input corresponding to a location of the user is applied, the controller controls the flying bot to be returned to the user.

10. The flying bot control device of claim 9, wherein the controller controls the flying bot to be returned to the user along a path along which the flying bot has moved to the current position.

11. The flying bot control device of claim 1, wherein the controller displays map information including a current position of the flying bot on the display unit, and displays a graphic object indicating information related to the obstacle on the map information.

12. The flying bot control device of claim 3, wherein when the flight control mode is determined as the third person control mode or the position designation mode, the controller switches the flight control mode of the flying bot to the first person control mode according to a result of sensing a surrounding situation of the flying bot, and the flight control mode of the flying bot is switched to the first person control mode when obstacles equal to or greater than a preset number are sensed in the vicinity of the flying bot or when obstacles equal to or greater than the preset number are recognized according to a result of analyzing an image received from the camera provided in the flying bot.

13. The flying bot control device of claim 2, wherein the controller switches the flight control mode of the flying bot on the basis of a result of further sensing a current altitude of the flying bot and a meteorological situation sensed by the flying bot.

14. The flying bot control device of claim 3, further comprising:
a gaze recognizing unit recognizing user's eyes,
wherein when a time duration in which the user has gazed the flying bot control device is equal to or greater than a preset time duration according to a result of recognizing the user's eyes through the gaze recognizing unit, the controller switches the flight control mode of the flying bot to the first person control mode.

15. The flying bot control device of claim 1, wherein the controller drives a camera provided in the flying bot to capture an image received from the camera according to a user selection, and controls a flying state of the flying bot differently according to an image capture mode of capturing the image.

16. The flying bot control device of claim 15, wherein
the image capture mode includes a panorama image capture mode for capturing a panorama image, and
when the image capture mode is the panorama image capture mode, the controller controls the flying bot to move according to a movement direction in accordance with control of the user in a state in which a direction in which the camera provided in the flying bot is fixated to a specific direction in accordance with control of the user.

17. The flying bot control device of claim 16, wherein the controller automatically switches the image capture mode on the basis of at least one of a position, an altitude, or a surrounding situation of the flying bot according to a result of analyzing an image sensed by the camera provided in the flying bot.

18. A method for controlling a flying bot, the method performed by a control device and comprising:
receiving information related to at least one of a position or a surrounding situation of the flying bot from the flying bot;
determining a flight control mode of the flying bot on the basis of the received information;

determining a movement direction and a rotation direction of the flying bot on the basis of a location of a user, in accordance with a user input according to the determined flight control mode of the flying bot;

displaying information related to control of the flying bot on a display according to the determined flight control mode of the flying bot;

moving the flying bot according to a user input and performing a function executable in the flying bot;

when a result of sensing an obstacle adjacent to the flying bot is received from the flying bot, displaying information regarding the sensed obstacle on the display; and displaying a position and a direction of the obstacle using separate graphic objects, wherein the graphic objects are displayed in different colors or forms according to a distance between the flying bot and the sensed obstacle.

\* \* \* \* \*